Jan. 23, 1962     L. L. GENUIT     3,018,408
HIGH FREQUENCY LIGHTING SYSTEMS AND BALLAST CIRCUITS THEREFOR
Filed May 18, 1960     3 Sheets-Sheet 2
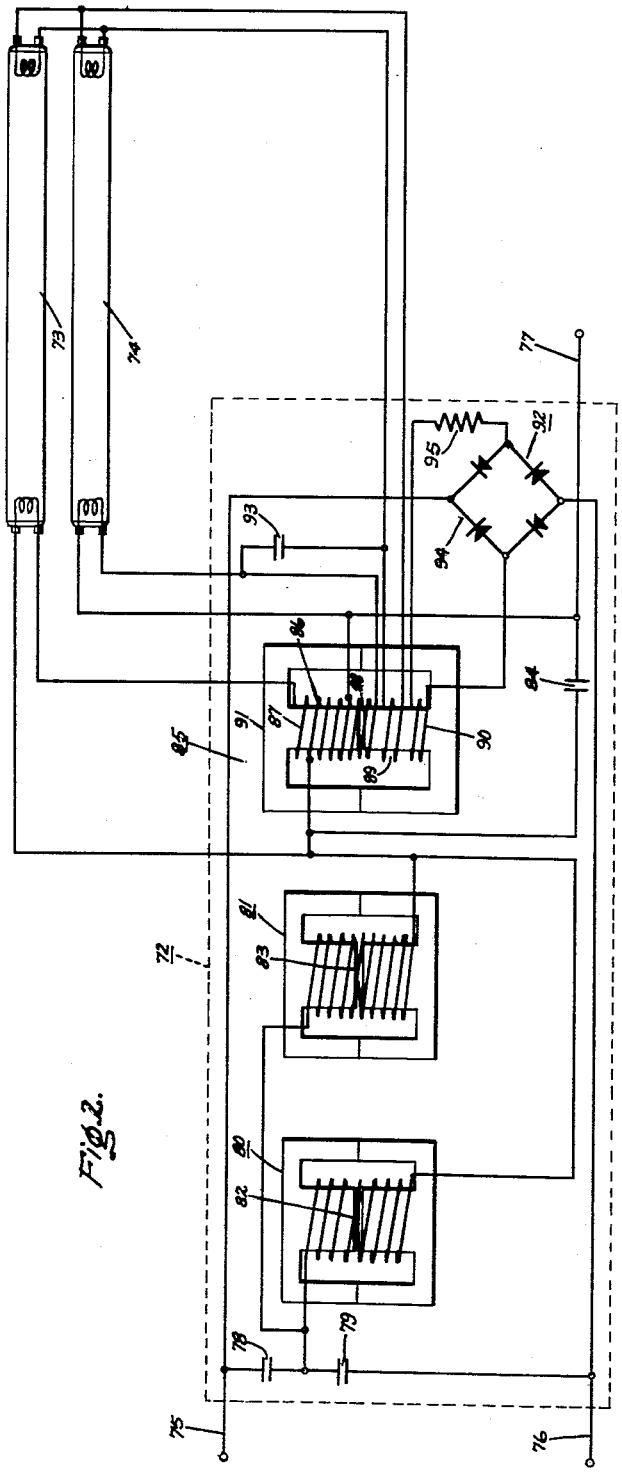
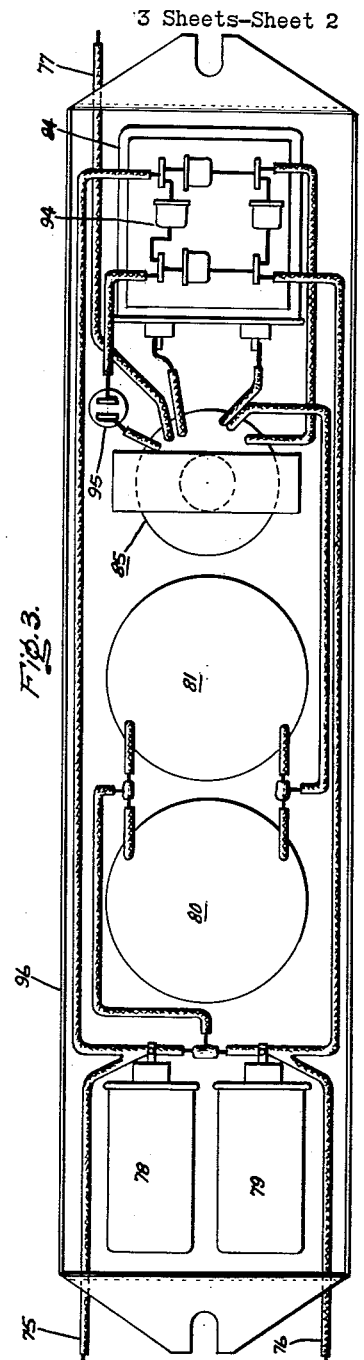
Inventor:
Luther L. Genuit.
by Henry J. Marusak
Attorney.

Jan. 23, 1962   L. L. GENUIT   3,018,408
HIGH FREQUENCY LIGHTING SYSTEMS AND BALLAST CIRCUITS THEREFOR
Filed May 18, 1960   3 Sheets-Sheet 3
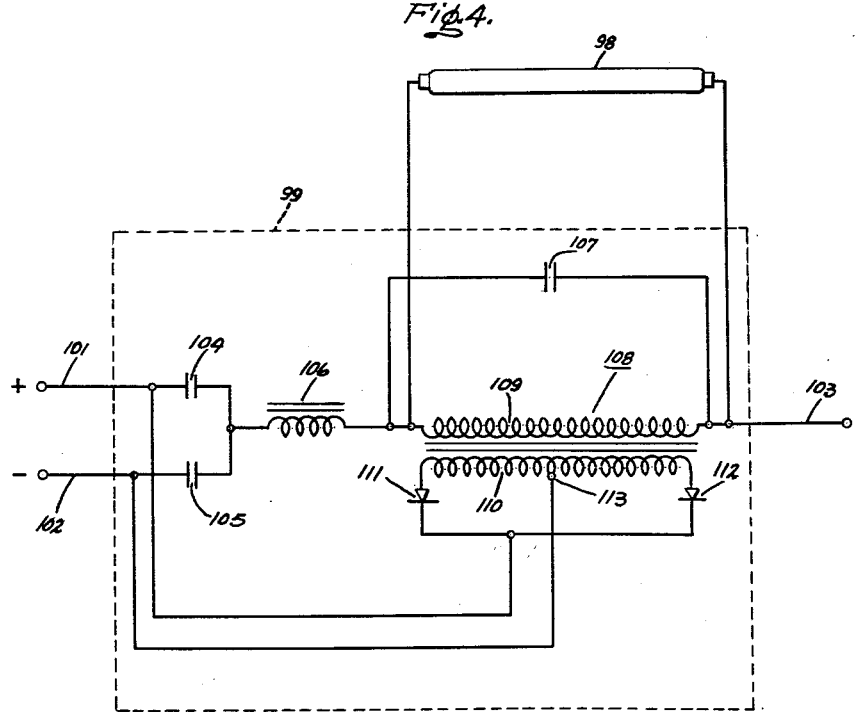
Inventor:
Luther L. Genuit,
by Henry J. Marciniak
Attorney.

United States Patent Office 3,018,408
Patented Jan. 23, 1962

3,018,408
HIGH FREQUENCY LIGHTING SYSTEMS AND BALLAST CIRCUITS THEREFOR
Luther L. Genuit, Danville, Ill., assignor to General Electric Company, a corporation of New York
Filed May 18, 1960, Ser. No. 29,982
14 Claims. (Cl. 315—95)

This invention relates to high frequency lighting systems and ballast circuits for high frequency lighting systems and more particularly to ballast circuits for use in conjunction with static inverters.

High frequency alternating lighting systems employing inverters for the purpose of frequency conversion are finding increasing use in applications, such as airplanes and buses, where alternating current power at standard frequencies is not available. By employing higher frequencies, it is not only possible to increase the over-all efficiency of the system, but to reduce the size and weight of the auxiliary equipment required. Self-excited inverters have been found to be particularly suitable for such applications since they can be readily adapted to convert a direct current supply into an alternating current at a high frequency.

In the inverter circuits to which the present invention is applicable, the load circuit has associated with it an inductance, a resistance and capacitance whereby it functions as an oscillatory circuit. Such inverter circuits utilize the resonant characteristics of the load circuit to maintain their oscillations and also have one or more capacitors which are alternately charged and discharged as a direct current input is converted into an alternating current supply. An inverter circuit of this type is described and claimed in my copending application Serial Number 5,847, filed on February 1, 1960, and assigned to the same assignee as the present invention.

Where a static inverter is used to supply a high frequency alternating current to lamps ballasted in a lead-lag arrangement, generally, half of the lamps are supplied with a leading current and the other half are supplied with a lagging current. The ballast and inverter are adjusted so that with all lamps in operation, the leading and lagging currents are substantially equal, and the load circuit is operated at a power factor of approximately one hundred percent. In the event that a lamp fails to operate, the load current will have either a lagging or a leading power factor at the resonant frequency of the tuned oscillatory circuit. However, the inverter will then shift its frequency of operation to a new resonant frequency of the inverter and load combination. This new frequency differs from the frequency that gave equal lead and lag currents. Thus, it will be seen that such high frequency inverter lighting systems possess the disadvantage that the individual lamp currents are not independent of the failure of the other lamps in the circuit.

It is desirable, therefore, that a ballast circuit be developed for use in conjunction with self-excited inverters in which the individual lamp currents are independent of failures of the lamps in the circuit. In other words, the ballast circuit used in conjunction with inverter circuits should be capable of operating a lamp load consisting of any number of lamps within the rated volt ampere capacity of the inverter circuit. Further, such a ballast circuit should provide the requisite starting and operating voltage for the arc discharge lamps and perform its usual current limiting function in view of the negative resistance characteristics of the lamps.

A resonant inverter circuit, as the term is used herein, denotes a self-excited inverter circuit that converts a direct current input into an alternating current and utilizes the resonant characteristics of an oscillatory circuit to maintain its oscillations, the inverter circuit including one or more capacitors which are alternately charged and discharged as the direct current is converted into an alternating current.

A general object of the invention is to provide an improved ballast circuit for use in high frequency lighting systems energized by resonant inverter circuits.

It is another object of the invention to provide an improved ballast circuit for use in high frequency lighting systems energized by resonant inverter circuits in which the individual lamp currents are independent and are not affected by lamp failures in other parts of the system.

These and other objects and advantages of the present invention are achieved by a ballast circuit in which the capacitive and inductive reactive components of the inverter circuit also serve as the ballast for the lamps. In accordance with the invention, each lamp or pair of lamps has associated with it a tuned oscillatory circuit resonant at the operating frequency of the inverter circuit. Further, each of the individual tuned circuits resonates at the resonant frequency of the total system. The resonant frequency of the total system is therefore independent of the number of individual circuits connected in the system. In view of the fact that the resonant frequency of the system is independent of the number of individual tuned circuits in operation, lamp failures can occur in the system without disturbing the operation of other lamps. Thus, the circuit of the invention can be operated with as few as one lamp or as many lamps as the current rating of the controlled rectifiers of the inverter circuit permit.

In another aspect of the invention, a magnetizing reactance is introduced in the lamp ballast transformer in parallel with the lamp load. A spacer in the core of the ballast transformer is used to introduce this magnetizing reactance. I have found that by the use of the spacer, lamp starting and operating stability were appreciably improved when this spacer was employed between the core halves of the ballast transformer.

The subject matter which I regard as my invention is set forth in the appended claims. The invention itself, however, together with further objects and advantages thereof may be understood by referring to the following description taken in connection with the accompanying drawings in which:

FIG. 2 is a schematic circuit diagram showing the coil and core arrangement of a ballast circuit of the invention for starting and operating a pair of lamps;

FIG. 3 is a top view of a ballast case showing the arrangement of the components in the ballast circuit of the embodiment of the invention illustrated in FIG. 2; and FIG. 4 is a schematic circuit diagram of another embodiment of the invention.

Figure 1:
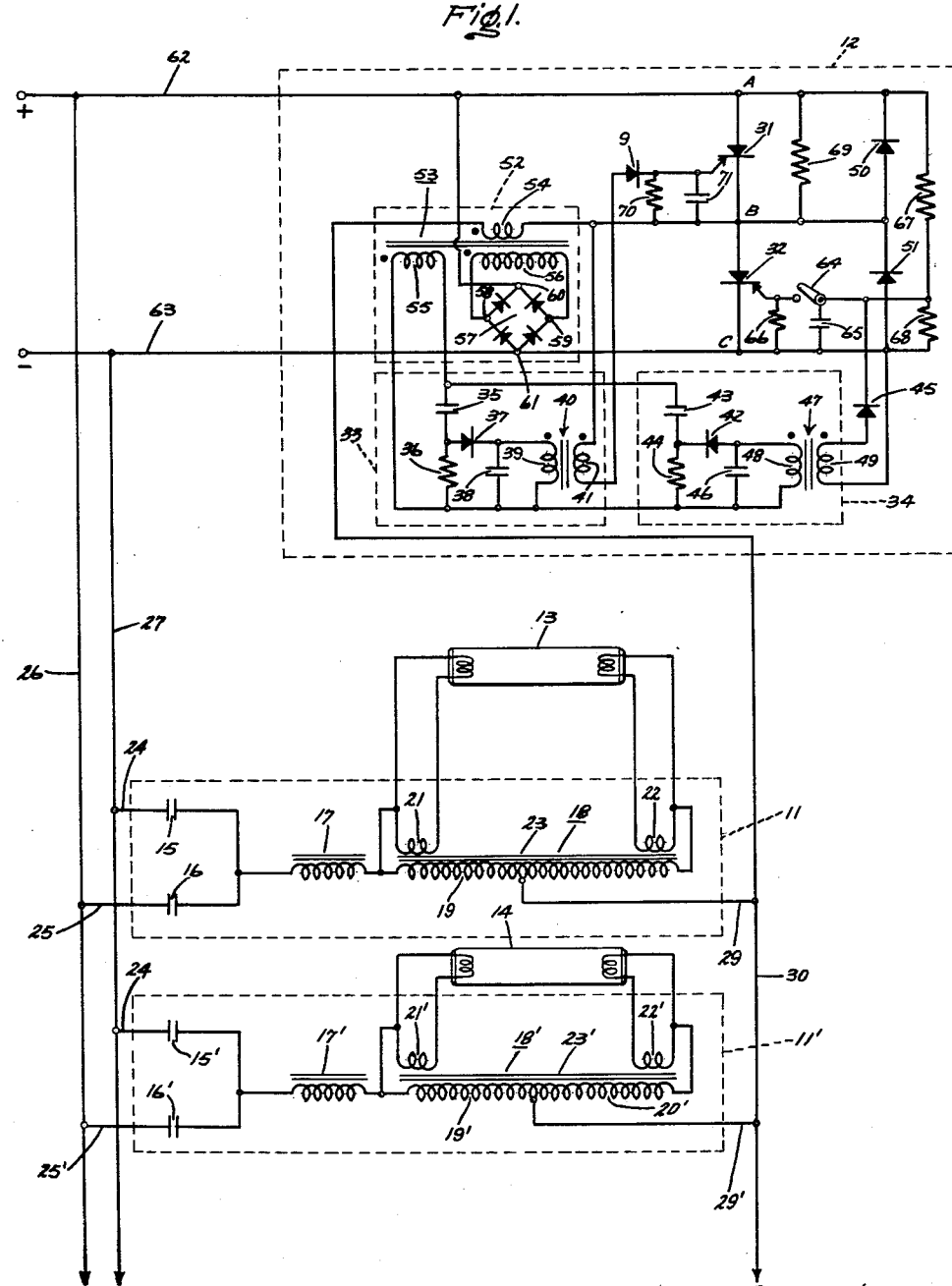
FIG. 1 is a schematic circuit diagram of a lighting circuit in which the invention is embodied.

A resonant inverter circuit which can be used to provide the high frequency alternating current supply to the circuit of the invention is described and claimed in my aforementioned copending application Serial No. 5,847. Such an inverter circuit must have associated with it an inductance, a resistance and a capacitance whereby the load circuit functions as an oscillatory circuit. Generally, in such circuits suitable values are selected for the inductor and capacitors in the circuit so that the load circuit will resonate at a predetermined frequency of operation. In FIG. 1, the ballast circuits shown enclosed in a dashed rectangle and identified by reference numerals 11, 11' not only supply the reactive components required by the resonant inverter circuit shown enclosed in a dashed rectangle generally identified by reference numeral 12, but also serve as a ballast for a pair of fluorescent lamps 13, 14. It will be understood that the polarity reversal resulting from the damped oscillation in the ballast circuits 11, 11' provides the inverse voltage required for a conducting controlled rectifier to revert to a blocking state at the completion of its operating cycle.

Ballast circuit 11 includes a pair of capacitors 15, 16, an inductor 17, and a transformer 18 having a primary 19, a secondary 20, cathode heating windings 21, 22 and a magnetic core 23. Similarly, ballast circuit 11' includes a pair of capacitors 15', 16', an inductor 17', and a transformer 18' having a primary 19', a secondary 20', cathode heating windings 21', 22' and a magnetic core 23'. It will be appreciated that the inductors 17, 17' can be eliminated if transformers 18, 18' are designed to provide an appropriate value of leakage reactance and an appropriate value of secondary magnetizing reactance.

Preferably, a pair of capacitors is employed in the ballast circuits 11, 11' since the number of pulses drawn from the direct current supply (not shown) are doubled. However, it will be appreciated that the circuit can be operated with only one of the capacitors 15, 16 of ballast circuit 11 or one of the capacitors 15', 16' of ballast circuit 11'. However, when only a single capacitor is used, the current pulse drawn from the direct current supply is twice as large and occurs half as often. Therefore, a single capacitor would have to have twice the capacitance. The capacitors 15, 16 serve a dual function in the lamp circuit. A part of the combined capacitive reactance of capacitors 15, 16 resonates with inductor 17 to form the capacitive and inductive components of the inverter tuned circuit. The other portion of the capacitive reactance of capacitors 15, 16 in conjunction with the magnetizing reactance of transformer 18 provides a half-monocyclic network for the regulation or ballasting of the lamp current.

As shown in FIG. 1, it will be seen that ballast circuit 11 is connected by a pair of external leads 24, 25 across the direct current supply lines 26, 27 and by a third external lead 29 to a switching network output line 30. In a similar manner, ballast circuit 11' is connected by a pair of external leads 24', 25' across supply lines 26, 27 and by a third external lead 29' to switching network output line 30. Additional ballasts are connected in the same manner across the direct current supply lines 26, 27 and the switching network output line 30. Thus, each of the individual ballast circuits 11, 11' and any other ballast circuits connected in lighting systems are independently tuned at the frequency of operation. Thus, the frequency of the total lighting system is not affected by the number of lamps connected in the circuit. The significant advantage of this arrangement is that when a lamp failure occurs in one or more of the ballast circuits, the system can still be operated at its resonant frequency.

The high frequency alternating current supplied to lamps 13, 14 and any other connected in the system is obtained by alternately switching a pair of controlled rectifiers 31, 32 of the inverter 12 which are driven by a pair of symmetrical firing circuits 33, 34. The firing circuit 33 includes a capacitor 35 serially connected with a resistor 36, a diode 37 and a capacitor 38 connected across a primary winding 39 of reactor 40. The reactor 40 has a secondary winding 41 connected with the gate electrode of controlled rectifier 31. Thus, the reactor 40 provides direct current isolation of the firing circuit 33 and alternating current coupling with the gate electrode of the controlled rectifier 31. The primary and secondary windings 39, 41 are connected so that when current is flowing out of the upper end of the primary winding 39, an induced current flows out of the lower end of the secondary winding 41.

Firing circuit 34 has the same general configuration as firing circuit 33 except that a diode 42 is connected in reverse position as compared with the diode 37 in firing circuit 33. Thus, the diode 42 will permit a current flow in firing circuit 34 when diode 37 is blocking the current flow in firing circuit 33. Firing circuit 34 includes a serially connected capacitor 43 and resistor 44, the diode 42 and a tuned network comprising a capacitor 46 and a reactor 47 having a primary winding 48 and a secondary winding 49. The secondary winding 49 is connected so that when current flows out of the lower end of the primary winding 48, an induced current flows out of the upper end of the secondary winding 49.

A pair of diodes 50, 51 are provided to carry the inverter current during the commutation period of the controlled rectifiers 31, 32. The diodes 9, 45 are provided in the gate circuits of the controlled rectifiers 31, 32 to prevent the inverse voltage from being applied between cathode and gate during the reverse part of the cycle. Further, a current sensing network 52 is provided to supply an approximately square wave voltage to the firing circuits 33, 34. The current sensing network 52 includes a transformer 53 having a primary winding 54, secondary windings 55, 56 and a bridge rectifier 57 having its input terminals 58, 59 connected across the secondary winding 56 and its output terminals 60, 61 connected across the direct current supply input leads or terminals 62, 63. Bridge rectifier 57 being connected across the secondary winding 56 causes the transformer 53 to operate at a fixed voltage over a wide range of current variations.

The starting arrangement for the inverter circuit 13 includes a switch 64, a capacitor 65, a resistor 66 connected across the capacitor 65, serially connected resistors 67, 68 and a resistor 69. The ohmic values of the resistors 67, 68 determine the voltage to which the capacitor 65 will charge when the switch 64 is in the open position, the resistors 67, 68 serving as a voltage divider. Before starting of the inverter circuit, the resistor 69, in effect, serves to short out controlled rectifier 31 and to cause the direct current voltage input which is applied at terminals 62, 63 to appear across controlled rectifier 32. Rectifier 32 is initially triggered to start the operation of the circuit. Also, the resistor 69 causes most of the applied voltage to be impressed across the capacitors 15, 15'.

A capacitor 71 and a resistor 70 are connected across the gate input of controlled rectifier 31 in order to reduce the impedance at the gate terminal and to suppress voltage spikes that might appear in the circuit. Similarly, the resistor 66 and capacitor 65 are connected across the gate of controlled rectifier 32 to reduce the impedance at the gate terminal and to suppress any voltage spikes that might appear in the gate circuit.

In FIG. 2, I have illustrated a ballast circuit 72 in accordance with the present invention for starting and operating two arc discharge lamps 73, 74. The ballast circuit 72 is provided with external leads 75, 76 for connection across direct current supply lines (not shown) and an external lead 77 for connection to the output line of a switching network such as is shown in FIG. 1. Two capacitors 78, 79 are connected across external leads 75, 76. A pair of ferrite cup core inductors 80, 81 are connected in parallel and are provided with air gaps 82, 83, respectively. It will be seen that the lamps 73, 74 are connected across a capacitor 84. I have found that by connecting the lamps 73, 74 in parallel with the capacitor 84 a more nearly sinusoidal current is supplied to the lamps 73, 74 than is obtained by connecting the lamps in parallel with the inductance provided by the magnetizing reactance of the transformer 18 of FIG. 1.

A transformer 85 is connected in series circuit with external lead 77 and the parallel connected inductors 80, 81. The transformer 85 has a primary winding 86, cathode heating windings 87, 88, 89, a voltage limiting secondary 90 and a ferrite E-shaped core 91. It is the purpose of transformer 85 to provide the filament heating current to the lamps 73, 74, which are rapid start type of lamps and in conjunction with a voltage limiting network 92 to limit the voltage across the lamps 73, 74 during starting. A capacitor 93 is connected across lamp 74 to aid in starting.

The voltage limiting network 92 comprises the secondary winding 90, the bridge rectifier 94, and a resistor 95. The bridge rectifier 94 connected across the secondary 90 of transformer 85 causes transformer 85 to operate at a fixed voltage during starting. It will be appreciated that a center tap transformer having the center tap of its secondary connected with the direct current power source and each end of the secondary connected in series with a rectifier, may be used in place of the bridge rectifier arrangement shown in FIG. 2.

In FIG. 3, the physical arrangement of the components shown schematically in the diagram of FIG. 2 is illustrated. The components are shown arranged in a ballast case 96. To indicate the correspondence between the components of FIGS. 2 and 3, like reference numerals are used to identify corresponding components.

The external leads 75, 76 are brought out of the ballast case 96 for connecting the circuit across the direct current source, and the external lead 77 is brought out for connection with the inverter output line. The external leads which are brought out of the ballast case 96 for connection to the lamps 73, 74 are not shown.

The capacitors 78, 79 are disposed in a side by side relationship at one end of the ballast case 96. One terminal of each of these capacitors is hidden and leads 75 and 76 are connected to the hidden terminals. The cup core inductors 80, 81, the transformer 85 and the capacitor 84 are arranged along the longitudinal axis of the ballast case 96. Attached to one side of the capacitor 84 is a terminal pad 97 to which the bridge rectifier 94 is soldered. Like a conventional ballast used in 60 cycle lighting applications, the ballast case 96 containing the high frequency ballast circuit of the invention can be readily attached to a fluorescent lamp fixture.

Referring now to FIG. 4, there is shown a ballast circuit in accordance with the invention for starting and operating a single instant start lamp 98. The ballast circuit is enclosed in the dashed rectangle shown in FIG. 4 and is generally identified by the reference numeral 99. External leads 101, 102 are provided for connection with the direct current power source, and the external lead 103 is brought out for making a connection with the switching network output line. A pair of capacitors 104, 105 are connected in circuit with the external leads 101, 102. An inductor 106 and a capacitor 107 are serially connected in circuit with the external lead 103.

A voltage limiting circuit comprising a transformer 108 having a primary winding 109 and a center tap secondary winding 110 and diodes 111 and 112 connected with the ends of the secondary winding 109 protects the lamp circuit against the possibility of voltage runaway in the event of an open circuit. The center tap 113 is connected to the external lead 101 which is for connecting with the positive side of the direct current power supply.

The operation of the ballast circuit of FIG. 1, in accordance with the present invention, will now be described in conjunction with the resonant inverter shown in FIG. 1. It will be seen that when the switch 64 is in the open position and a direct current voltage impressed across the input terminals 62, 63, the capacitor 65 will be charged to a predetermined value depending upon the ratio of the ohmic value of the resistors 67, 68. The operation of the inverter circuit is initiated by closing the switch 64, thereby discharging the capacitor 65 to cause a current to flow to the gate electrode of controlled rectifier 32. When controlled rectifier 32 is initially fired, the capacitors 15, 15′ discharge since the resistor 69 causes only the capacitors 15, 15′ to be charged before switch 64 is closed.

The path of current flow will now be described in connection with ballast circuit 11. It will be understood that the current path through the other ballast circuits connected to the direct current supply lines 26, 27 and the inverter output line is essentially the same. During discharge of the capacitor 15, the current flows through the inductor 17, the primary 19 of the transformer 18, external lead 29, switching network output line 30, the primary 54 of the current sensing transformer 53, and through controlled rectifier 32 to the negative or grounded lead 63 of the circuit.

The current sensing transformer 53 presents a high impedance to current flow until the voltage across the secondary winding 56 reaches the input direct current level, at which time the voltage of the transformer 53 remains fixed at this level as current is fed back to the input terminals 62, 63 through the output connections 60, 61 of the bridge rectifier 57.

At this time, a current is induced in the secondary winding 55, the direction of current flow being out of the left end of the winding 55 as shown in FIG. 1. The diode 37 blocks this current flow to the firing circuit 33. However, diode 42 admits the current to the firing circuit 34, thereby charging the capacitors 43, 46. Since the capacitor 46 and the reactor 47 comprise a tuned circuit, a damped oscillation occurs and the polarity of the voltage across the reactor 47 is reversed after one half cycle of the oscillation. A current pulse is induced in the secondary winding which is not blocked by the diode 45. The current pulse occurs shortly after initiation of the first half cycle (time delay set to provide controlled rectifier recovery time) and would fire controlled rectifier 32 if it had not already been fired by the starting network.

At the end of the first half cycle, the current through controlled rectifier 32 goes to zero. At this instant, the common junction point B between the two controlled rectifiers 31, 32 is negative with respect to junction C by virtue of the charges accumulated by capacitors 15, 16. Due to oscillatory characteristics of the ballast circuit 11, the current flow reverses. The path of current flow now is starting at the junction of capacitors 15 and 16, through capacitor 15, through point C, diode 51, point B, primary 54 of transformer 53, output line 30, external lead 29, the primary 19 of the ballast transformer 18, inductor 17 and back to the junction of capacitors 15 and 16. At the same time, a second current equal instantaneously to one half the magnitude of the current just described flows out of the negative terminal 63 through capacitors 15 and 16 and into the positive terminal 62 of the D.-C. supply.

The reversal of current through the primary 54 of the current sensing transformer 53 causes a voltage of reverse polarity to be induced across the secondary winding 55 which energizes the firing circuit 33 and controlled rectifier 31 is fired. When controlled rectifier 31 is fired, the path of the main current flow is now from the positive input terminal 62 through point A, controlled rectifier 31, point B, primary winding 54, output line 30, external lead 29, the primary 19 of the ballast transformer 18 and through inductor 17 to the capacitors 15, 16.

It will be noted that current is no longer carried by the by-pass rectifier 51 because the conduction of controlled rectifier 31 switches point B to the potential of point A less the forward anode-to-cathode drop of controlled rectifier 31. The current through controlled rectifier 31 builds up to a peak and falls off to zero in the form of a damped half sine wave. At this instant, the point B is positive with respect to point A and a reverse current begins to build up in the ballast circuit 11. This reverse current flows through external lead 29 and the output line 30 to the primary winding 54 of transformer 53 and causes an induced secondary current to flow in the secondary 55. This induced current is opposite in direction to the current flow induced during the previous half cycle. As a result, firing circuit 34 which drives controlled rectifier 32 is now energized. After a predetermined time interval, the firing circuit 34 triggers controlled rectifier 32 and another cycle is initiated.

It will be seen, therefore, that the capacitors 15, 16 are charged and discharged during alternate half cycles.

Further, the capacitors 15, 16 in conjunction with the primary magnetizing reactance of the transformer 18 function, in effect, as a half-monocyclic network to perform the ballasting or current limiting function required because of the negative characteristic of an arc discharge lamp. Furthermore, the ballast circuit 11 serves as a resonant circuit and the resonant characteristics of the ballast circuit 11 are utilized in maintaining the oscillations of the inverter 12.

The ballast circuit 72 of FIG. 2 operates in substantially the same manner as the ballast circuit 11 of FIG. 1. The capacitors 78, 79 are alternately charged and discharged through inductors 80 and 81 and the parallel combination of the lamp load and capacitor 84 during alternate half cycles to provide a high frequency alternating current supply to the pair of serially connected rapid start lamps 73, 74. Two parallel connected inductors 80, 81 were employed instead of a single inductor because the required inductor volt-ampere rating was too great to be accommodated by a single commercially available ferrite cup core.

It was found that ballast circuit 72 also functions as a half-monocyclic network when operated in the inverter circuit. Thus, it is essentially a constant current device. The voltage limiting circuit 92 is provided to protect the circuit against excessive voltage in the event of an open circuit in the arc discharge lamp circuit that might damage the components of the ballast circuit.

In both ballast circuits of FIGS. 2 and 4, a capacitor is connected across the lamp or lamps. It was found that the lamp current was more sinusoidal when the lamp load was operated across a capacitive portion of the half-monocyclic network. It will be understood that when an additional capacitor is employed in the circuit, the component values of the ballast circuit must be adjusted so that capacitive reactances of the capacitors in the ballast circuit are equal to the net inductive reactance in the ballast circuit at the desired operating frequency.

The ballast circuit 99 of FIG. 4 operates in substantially the same manner as the ballast circuit 11 of FIG. 1. The inductor 106 performs the dual function of serving as a portion of a half monocyclic current limiting network and as a part of an oscillatory circuit required to maintain the oscillations of the inverter circuit. When the external leads 101, 102 are connected across the direct current output lines of the power supply to which the inverter is connected and when external lead 103 is connected to the switching network output line, the capacitors 104, 105 will be charged and discharged on alternate half cycles to provide an alternating current to the lamp 98. The current supplied to the lamp is independent of the resistance of the lamp and is directly proportional to the voltage across external leads 101, 102. Thus, the necessary voltage transformation required to start the lamp 98 is provided since the voltage across the lamp will rise to whatever level is required to produce the current level dictated by the voltage supplied to the ballast 99. The voltage limiting circuit comprising the center tap transformer and diodes 111, 112 serves to safeguard the lamp circuit against a voltage runaway in the event of an open circuit.

In the hereinafter described exemplification of the invention, a spacer of nonmagnetic material was inserted between core halves of transformers 18, 18'. In the illustrative example of the invention, the transformers 18, 18' were ferrite cup core type of transformers. It was found that lamp starting and operating stability were improved when approximately a 40 mil separation was obtained between the core halves. The air gap introduces a magnetizing reactance in parallel with the lamp load. This magnetizing reactance in conjunction with a part of the capacitive reactance of capacitors 15, 16 serves as a half monocyclic network and provides the ballasting function required by the fluorescent lamp load. In this case, the lamps are connected across the inductive portion of the half monocyclic network. It will be appreciated that at frequencies above 1000 cycles per second, a fluorescent lamp still has a negative resistance characteristic.

The ballast circuit illustrated in FIG. 1 was tested and operated in connection with a resonant inverter energized from a 230 volt direct current source to supply an alternating current having a frequency of 2500 cycles per second to eight foot power groove fluorescent lamps. Instead of a single lamp as shown in FIG. 1, a pair of lamps was connected across the transformers 18, 18' and an additional cathode heating winding was provided to provide heating current for additional lamp filaments. The circuit operated satisfactorily when one pair of lamps was in the circuit or when more than one pair of lamps was operated in the circuit. The only factor limiting the number of lamps that could be added to the lighting circuit was the current rating of the inverter circuit. The following ballast circuit components were used and they are given herein by way of example and not to limit the invention thereto:

Capacitors 15, 16, 15', 16'___ 0.24 microfarad.
Inductors 17, 17'_____ Two reactors connected in parallel, each employing an Allen Bradley ferrite cup core (size 207A) with the center post of the two core halves ground to provide a total air gap of ½ inch. The coil for each reactor consisted of 504 turns of .0339 inch wire.
Transformer cores 23, 23'____ Allen Bradley ferrite cup core (size 207A).
Primary windings 19, 19'____ 104 turns of .0403 inch wire.
Secondary windings 20, 20'__ 231 turns of .0285 inch wire.
Cathode heating windings 21, 22, 21', 22'_____ 5 turns of 0.0285 inch wire for all windings.

The direct current voltage was supplied to inverter 12 by means of a three phase full wave bridge rectifier connected to a three phase 220 volt alternating current line through variable autotransformers. A filter capacitor of approximately 125 microfarads was connected across the direct current terminals of the rectifier. The operating currents and voltages of the ballast circuit were as follows:

Current through inductors 17, 17' 4.35 amperes.
Lamp current_____ 1 ampere.
Lamp voltage_____ 275 volts.
Primary transformer current____ 3.53 amperes.
Voltage across capacitors 15, 16, 15', 16'_____ 600 volts.
Frequency_____ 2500 cycles per second.
Voltage across inductors 17, 17'_ 470 volts.

It will be understood that the component values and specific types of components which have been described herein are intended for illustrative purposes only and that these may be changed or varied without departing from the spirit and scope of the invention. While particular embodiments of the invention have been described herein, it will be apparent that many modifications may be made. It is to be understood, therefore, that I intend by the appended claims to cover all such modifications that fall within the true spirit and scope of my invention.

What I claim as new and desire to secure by Letters Patent of the United States is:

1. A ballast circuit for starting and operating an arc discharge lamp with high frequency alternating current produced by said ballast in conjunction with an external switching network energized from a direct current power source, said ballast circuit comprising: a pair of input leads for connection across the direct current power source, a switching network output lead, a pair of capacitors connected in series circuit relation across said input leads, an inductor connected in circuit with said capacitors, and a transformer having a primary and at least one secondary winding, said primary winding being connected in series circuit relation with said inductor and said switching network output lead, said capacitors being alternately charged and discharged at alternate half cycles of the alternating current and said capacitors, said inductor and the magnetizing reactance of said transformer being associated in tuned circuit relation with said switching network to maintain oscillations at a predetermined frequency and comprising a half monocyclic network for the purpose of limiting the current supplied to the arc discharge lamp.

2. A ballast circuit for starting and operating an arc discharge lamp with high frequency alternating current in conjunction with an external switching network energized from a direct current power source, said ballast circuit comprising: a pair of input leads for connection across said direct current power source, a switching network output lead, a pair of capacitors connected in series circuit relation across said input leads, an inductor connected in series circuit relation with said capacitors, a third capacitor connected in series circuit with said inductor and with said switching network output leads, circuit means connecting the lamp across said third capacitor, said pair of capacitors being alternately charged and discharged at alternate half cycles by said switching network and said pair of capacitors, said third capacitor and said inductor being associated in tuned circuit relation wtih said switching network to maintain oscillations at a predetermined resonant frequency and operating as a half monocyclic network for the purpose of limiting the current to the arc discharge lamps.

3. The ballast circuit set forth in claim 2 in which a voltage limiting means is connected in circuit with the arc discharge lamp, said means comprising a transformer having a primary winding connected across the arc discharge lamp, a secondary winding and a bridge rectifier having one pair of its terminals connected across said secondary winding and the other of its pair of terminals connected across said input leads.

4. A ballast circuit for starting and operating a pair of arc discharge lamps with high frequency alternating current produced by the ballast network in conjunction with a switching network energized from a direct current power source, said ballast circuit comprising a pair of input leads for connection across said direct current power source, a switching network output lead, a pair of capacitors connected in series circuit relation across said input leads and joined at a common junction, an inductor connected to said junction, a transformer having a primary winding and at least one secondary winding, said primary winding being connected in series circuit relation with said inductor and with said switching network output lead, said capacitors being alternately charged and discharged at alternate half cycles by said switching network, circuit means connecting said pair of lamps across said primary winding and said secondary winding, said capacitors, said inductor and transformer magnetizing reactance being associated in tuned circuit relation with said switching network to maintain oscillations at a predetermined resonant frequency and operating as a half monocyclic network for the purpose of limiting the current to said pair of lamps.

5. A ballast circuit for starting and operating at least one arc discharge lamp with high frequency alternating current produced by the ballast circuit in conjunction with an external switching network energized from a direct current power source, said ballast circuit comprising: a pair of input leads for connection across said direct current power source, a switching network output lead for connection with said switching network, a pair of capacitors connected in series circuit relation across said input leads and joined at a common junction, an inductor connected to said junction, a third capacitor connected in series circuit relation with said inductor and said switching network output lead, a circuit means connecting at least one lamp across said capacitor, said pair of capacitors, said third capacitor and said inductor being associated in tuned circuit relation with said switching network to maintain oscillations at a predetermined frequency and operating as a half monocyclic network for the purpose of limiting the current to said at least one lamp.

6. A ballast circuit for starting and operating a pair of arc discharge lamps with high frequency alternating current produced by said ballast circuit in conjunction with an external switching network energized from a direct current power source, said ballast circuit comprising a pair of input leads for connection across said direct current power source, a switching network output lead, a pair of capacitors connected in series circuit relation across said input leads, a pair of parallel-connected inductors, said inductors being connected to said serially connected capacitors, a third capacitor connected in series circuit relation with said pair of inductors and with said switching network output lead, a transformer having a primary winding, a plurality of cathode heating windings and a voltage limiting secondary winding, circuit means connecting said primary across said lamps and said cathode heating windings in circuit with said lamps to provide heating current to the lamp filaments, a voltage limiting circuit comprising a rectifying means connected in circuit with said voltage limiting secondary and in circuit across said direct current input leads, said pair of capacitors, said pair of inductors, said third capacitor being associated in tuned circuit relation with said switching network to maintain oscillations at a predetermined frequency and operating as a half monocyclic network for the purpose of limiting the current to said pair of arc discharge lamps.

7. A system for operating a plurality of lamps with high frequency alternating current comprising: a switching network connected across said direct current source and having a switching network output line, a plurality of fluorescent lamps, a plurality of ballast circuits operatively associated with said plurality of lamps, each of said ballast circuits having a pair of direct current input leads for connection across said direct current source and a switching network output lead for connection to said output line, said ballast circuit including a pair of serially connected capacitors joined at a common junction and connected across said input leads, an inductor connected in circuit with said junction and a transformer means having a primary connected in circuit with said lamp, said primary being connected in series circuit relation with said inductor and said switching network output lead, said capacitors being charged and discharged on alternate half cycles of said alternating current supplied to said plurality of lamps and said capacitors, said inductor and the magnetizing reactance of said transformer of each of said ballast circuits being associated in tuned circuit relationship with said switching network to maintain oscillations at a predetermined frequency and each of said ballast circuits functioning as a half monocyclic network for the purpose of limiting the current supplied to its respective arc discharge lamp circuit.

8. A lighting system for operating a plurality of fluorescent lamps from a direct current source comprising a switching network connected across said direct current source, a pair of direct current input lines connected across said direct current source, a switching network output line connected in circuit with said switching network, a plurality of ballast circuits, each one of said plurality of ballast circuits being associated with at least one of said plurality of lamps, and including a pair of serially connected capacitors, a third capacitor and a reactor, said serially connected capacitors being connected to said direct current source and said reactor being connected in series circuit relation with said third capacitor and to said switching network output line, each of said ballast circuits having a resistive lamp load including an inductance and capacitance combined therewith for rendering said ballast circuit resonant at a predetermined frequency of operation, said capacitance being provided by said pair of serially connected capacitors and third capacitor and said reactor providing said inductance, said switching network including a pair of switching devices which are alternately turned on at said resonant frequency of said ballast circuit in response to currents from the plurality of said ballast circuits and which cause said serially connected capacitors to be charged and discharged at alternate half cycles to energize said lamps with half cycles of conduction of opposite polarity, and said serially connected capacitors, said third capacitor and said reactor providing the inductive reactance and capacitive reactance to cause said ballast circuit to operate as a half monocyclic network thereby providing the voltage transformation required to start said lamps and the ballasting action required to limit the lamp current.

9. The lighting system set forth in claim 1 wherein a third capacitor is connected in said ballast circuit across at least one of the lamp loads associated therewith, said third capacitor and said serially connected capacitors combining to provide the capacitance required in said ballast circuit to render said circuit resonant at said predetermined frequency of operation and to provide the capacitance required to cause said circuit to operate as a half monocyclic network.

10. A ballast circuit for starting and operating a pair of arc discharge lamps from a direct current power source and adapted for connection with switching devices of a switching network which are alternately turned on at a predetermined resonant frequency, said ballast circuit comprising: a pair of input leads for connection across said direct current power source, a switching network output lead, a pair of capacitors connected in series circuit relation across said input leads and joined at a common junction, an inductor connected in circuit with said capacitors, a third capacitor connected in series circuit relation with said inductor, said inductor and said capacitors forming the reactive elements of an oscillatory circuit tuned at said predetermined resonant frequency and causing the switching devices of said switching network to alternately turn on at said resonant frequency thereby charging and discharging said serially connected capacitors at alternate half cycles, said lamps being connected across one of said reactive elements so that said lamps are energized with half cycles of conduction of opposite polarity and said reactive elements of said ballast circuit being proportioned so that said ballast circuit operates as a half monocyclic network to provide the voltage transformation required to start said lamps and to ballast said lamps.

11. A ballast circuit for starting and operating at least one arc discharge lamp from a direct current power source in conjunction with a switching network having a pair of switching devices which are alternately turned on at a predetermined resonant frequency, said ballast circuit comprising: a pair of input leads for connection across said direct current power source, a switching network output lead for connection with the switching devices of said inverter, a pair of capacitors connected in series circuit relation across said input leads and being joined at a common junction, a transformer means having a primary winding and at least one secondary winding, said primary winding being connected in series circuit relationship with said junction and said switching network output lead, circuit means connecting at least one lamp across said transformer means, the inductance and capacitance of said serially connected capacitors and transformer combined with the lamp resistance rendering said ballast circuit resonant at said predetermined frequency of operation and said inductance and capacitance being proportioned so that said ballast circuit operates as a half monocyclic network to regulate the current supplied to said lamps.

12. The ballast circuit set forth in claim 11 wherein said transformer means includes an air gap in the magnetic core to provide a magnetizing reactance in parallel with said at least one lamp.

13. A ballast circuit for starting and operating at least one arc discharge lamp with high frequency alternating current produced by the ballast circuit in conjunction with an external switching network energized from a direct current power source, said ballast circuit comprising: an input lead for connection with said direct current power source, a switching network output lead for connection with said switching network, a first capacitor connected in series circuit relation with said input lead, an inductor connected in series circuit relation with said capacitor, a second capacitor connected in series circuit relation with said inductor and said switching network output lead, circuit means connecting said at least one lamp across said second capacitor, said first capacitor, said second capacitor and said inductor being associated in tuned circuit relation with said switching network to maintain oscillations at a predetermined frequency and operating as a half monocyclic network for the purpose of limiting current to said at least one lamp.

14. A ballast circuit for starting and operating at least one arc discharge lamp from a direct current power source and adapted for connection with switching devices of a switching network which are alternately turned on at a predetermined resonant frequency, said ballast circuit comprising: an output lead for connection with said direct current power source, a switching network output lead for connection with said switching devices, a first capacitor connected in series circuit relation with said input lead, an inductor connected in circuit with said first capacitor, a second capacitor connected in series circuit relation with said inductor, said inductor and said first and second capacitors forming reactive elements of an oscillatory circuit tuned at said predetermined resonant frequency and causing the switching devices of said switching network to alternately turn on at said resonant frequency thereby charging and discharging said first capacitor, said at least one lamp being connected across one of said reactive elements so that said at least one lamp is energized with half cycles of conduction of opposite polarity and said reactive elements of said ballast circuit being proportioned so that said ballast circuit operates as a high half monocyclic network to provide the voltage transformation required to start and ballast said at least one lamp.

References Cited in the file of this patent

UNITED STATES PATENTS

| | | |
|---|---|---|
| 2,284,407 | Edwards | May 26, 1942 |
| 2,300,916 | Fuerdy | Nov. 3, 1942 |
| 2,354,696 | Mettler | Aug. 1, 1944 |